(12) United States Patent
Zeghlache (10) Patent No.: US 11,125,076 B1
(45) Date of Patent: Sep. 21, 2021

(54) ACCELEROMETER BASED CASING COLLAR LOCATOR

(71) Applicant: SAUDI ARABIAN OIL COMPANY, Dhahran (SA)

(72) Inventor: Mohamed Larbi Zeghlache, Al Khubar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/934,585

(22) Filed: Jul. 21, 2020

(51) Int. Cl.
*E21B 47/092* (2012.01)
*G01P 15/105* (2006.01)
*G01V 3/30* (2006.01)

(52) U.S. Cl.
CPC .......... *E21B 47/092* (2020.05); *G01P 15/105* (2013.01); *G01V 3/30* (2013.01)

(58) Field of Classification Search
CPC .......... G01V 3/30; G01P 15/105; E21B 43/30
See application file for complete search history.

(56) References Cited

U.S. PATENT DOCUMENTS

| 3,163,487 | A | 12/1964 | Buck |
| 4,662,209 | A | 5/1987 | Brown |
| 6,543,538 | B2 | 4/2003 | Tolman et al. |
| 6,896,056 | B2 | 5/2005 | Mendez et al. |
| 8,875,785 | B2 * | 11/2014 | Coles ...................... E21B 47/04 166/255.1 |
| 9,328,578 | B2 * | 5/2016 | Kumaran ................ E21B 23/00 |
| 2013/0255939 | A1 * | 10/2013 | Kumaran ................ E21B 23/00 166/255.1 |
| 2017/0370189 | A1 * | 12/2017 | MacDougall ........... E21B 23/01 |

* cited by examiner

*Primary Examiner* — Alvaro E Fortich
(74) *Attorney, Agent, or Firm* — Osha Bergman Watanabe & Burton LLP (57) ABSTRACT

A method for locating a casing collar in a well is disclosed. The method includes lowering an accelerometer into the well to slide along a casing wall of the well, generating a data log by measuring an accelerometer signal from the accelerometer as the accelerometer slides along the casing wall, analyzing, by a computer processor, the data log with respect to a predetermined data feature to detect an accelerometer signal event, and determining, by the computer processor and based on the accelerometer signal event, a location of the casing collar in the well.

20 Claims, 7 Drawing Sheets

ACCELEROMETER BASED CASING COLLAR LOCATOR

BACKGROUND

The casing is a pipe cemented in place to stabilize the wellbore. The pipe usually includes multiple sections (referred to as casing joints) coupled together to achieve the required length and specification for the wellbore. A casing collar is a coupling used to join two casing joints together. A conventional casing and/or casing collar are made of steel. The casing collar may be a threaded coupling. A conventional casing collar locator is an electric logging tool that detects the magnetic anomaly caused by the relatively high mass of the casing collar. Logging tools or sensors package may obtain depth measurement using the conventional casing collar locator in addition to other conventional techniques such as wireline and slickline depth wheel, pipe tally, etc.

SUMMARY

In general, in one aspect, the invention relates to a method for locating a casing collar in a well. The method includes lowering an accelerometer into the well to slide along a casing wall of the well, generating a data log by measuring an accelerometer signal from the accelerometer as the accelerometer slides along the casing wall, analyzing, by a computer processor, the data log with respect to a predetermined data feature to detect an accelerometer signal event, and determining, by the computer processor and based on the accelerometer signal event, a location of the casing collar in the well.

In general, in one aspect, the invention relates to a system for locating a casing collar in a well. The system includes an accelerometer lowered into the well to slide along a casing wall of the well, a processor, and a memory coupled to the processor and storing instruction. The instructions, when executed by the processor, include functionality for generate a data log by measuring an accelerometer signal from the accelerometer as the accelerometer slides along the casing wall, analyzing the data log with respect to a predetermined data feature to detect an accelerometer signal event, and determining, based on the accelerometer signal event, a location of the casing collar in the well.

In general, in one aspect, the invention relates to a non-transitory computer readable medium storing instructions executable by a computer processor for locating a casing collar in a well. The instructions, when executed, include functionality for generating a data log by measuring an accelerometer signal from an accelerometer as the accelerometer slides along the casing wall, analyzing the data log with respect to a predetermined data feature to detect an accelerometer signal event, and determining, based on the accelerometer signal event, a location of the casing collar in the well.

Other aspects and advantages will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the invention provide a method, a system, and a non-transitory computer readable medium for locating one or more casing collars using an accelerometer. In one or more embodiments, an accelerometer based casing collar locator (ACCL) includes a downhole tool installed with the accelerometer where a standoff element coupled to the accelerometer is included on the exterior surface of the downhole tool. As the downhole tool travels through the cased wellbore, the standoff element contacts the interior surface of the casing and causes the accelerometer to record an event in the accelerometer data log when the standoff element comes across a tubing connection gap at each casing collar. The accelerometer data log is analyzed by a computer system to detect one or more casing collar locations. In one or more embodiments, the accelerometer data log is analyzed using machine learning techniques. In one or more embodiments, the downhole tool is a self-deployed downhole sensor with no mechanical contact between surface instruments and the downhole sensor.

Figure 1:
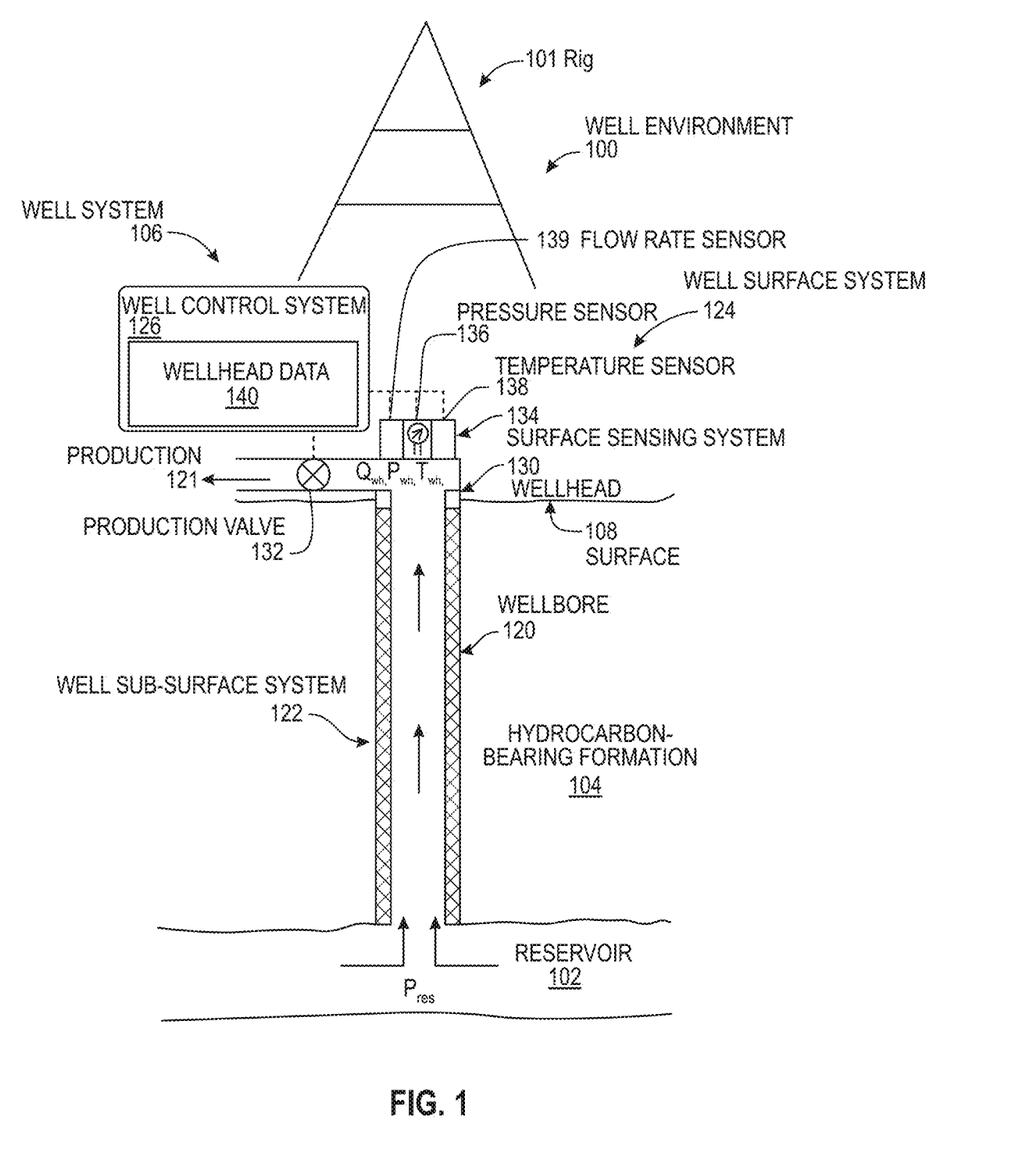
FIGS. 1 and 2 show systems in accordance with one or more embodiments.

Turning to FIG. 1, FIG. 1 shows a schematic diagram in accordance with one or more embodiments. As shown in FIG. 1, FIG. 1 illustrates a well environment (100) that includes a hydrocarbon reservoir ("reservoir") (102) located in a subsurface hydrocarbon-bearing formation ("formation") (104) and a well system (106). The hydrocarbon-bearing formation (104) may include a porous or fractured rock formation that resides underground, beneath the earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, capillary pressure, and resistivity. In the case of the well system (106) being operated as a production well, the well system (106) may facilitate the extraction of hydrocarbons (or "production") from the reservoir (102).

In some embodiments of the invention, the well system (106) includes a rig (101), a wellbore (120), a well sub-surface system (122), a well surface system (124), and a well control system ("control system") (126). The control system (126) may control various operations of the well system (106), such as well production operations, well completion operations, well maintenance operations, and reservoir monitoring, assessment and development operations. In some embodiments, the control system (126) includes a computer system that is the same as or similar to that of computer system (700) described below in FIGS. 7A and 7B and the accompanying description.

The rig (101) is the machine used to drill a borehole to form the wellbore (120). Major components of the rig (101) include the mud tanks, the mud pumps, the derrick or mast, the drawworks, the rotary table or topdrive, the drillstring, the power generation equipment and auxiliary equipment.

The wellbore (120) includes a bored hole (i.e., borehole) that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "downhole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) into the hydrocarbon-bearing formation (104) or the reservoir (102) during monitoring operations (e.g., during in situ logging operations).

In some embodiments, during operation of the well system (106), the control system (126) collects and records wellhead data (140) for the well system (106). The wellhead data (140) may include, for example, a record of measurements of wellhead pressure ($P_{wh}$) (e.g., including flowing wellhead pressure), wellhead temperature ($T_{wh}$) (e.g., including flowing wellhead temperature), wellhead production rate ($Q_{wh}$) over some or all of the life of the well (106), and water cut data. In some embodiments, the measurements are recorded in real-time, and are available for review or use within seconds, minutes or hours of the condition being sensed (e.g., the measurements are available within 1 hour of the condition being sensed). In such an embodiment, the wellhead data (140) may be referred to as "real-time" wellhead data (140). Real-time wellhead data (140) may enable an operator of the well (106) to assess a relatively current state of the well system (106), and make real-time decisions regarding development of the well system (106) and the reservoir (102), such as on-demand adjustments in regulation of production flow from the well.

In some embodiments, the well sub-surface system (122) includes casing installed in the wellbore (120). For example, the wellbore (120) may have a cased portion and an uncased (or "open-hole") portion. The cased portion may include a portion of the wellbore having casing (e.g., casing pipe and casing cement) disposed therein. The uncased portion may include a portion of the wellbore not having casing disposed therein. In some embodiments, the casing includes an annular casing that lines the wall of the wellbore (120) to define a central passage that provides a conduit for the transport of tools and substances through the wellbore (120). For example, the central passage may provide a conduit for lowering logging tools into the wellbore (120), a conduit for the flow of production (121) (e.g., oil and gas) from the reservoir (102) to the surface (108), or a conduit for the flow of injection substances (e.g., water) from the surface (108) into the hydrocarbon-bearing formation (104). In some embodiments, the well sub-surface system (122) includes production tubing installed in the wellbore (120). The production tubing may provide a conduit for the transport of tools and substances through the wellbore (120). The production tubing may, for example, be disposed inside casing. In such an embodiment, the production tubing may provide a conduit for some or all of the production (121) (e.g., oil and gas) passing through the wellbore (120) and the casing.

In some embodiments, the well surface system (124) includes a wellhead (130). The wellhead (130) may include a rigid structure installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (134). For example, a production valve (132) may be fully opened to enable unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

In some embodiments, the wellhead (130) includes a choke assembly. For example, the choke assembly may include hardware with functionality for opening and closing the fluid flow through pipes in the well system (106). Likewise, the choke assembly may include a pipe manifold that may lower the pressure of fluid traversing the wellhead. As such, the choke assembly may include set of high pressure valves and at least two chokes. These chokes may be fixed or adjustable or a mix of both. Redundancy may be provided so that if one choke has to be taken out of service, the flow can be directed through another choke. In some embodiments, pressure valves and chokes are communicatively coupled to the well control system (126). Accordingly, a well control system (126) may obtain wellhead data regarding the choke assembly as well as transmit one or more commands to components within the choke assembly in order to adjust one or more choke assembly parameters.

Keeping with FIG. 1, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature and flow rate of production (121) flowing through the wellhead (130), or other conduits of the well surface system (124), after exiting the wellbore (120). The surface sensing system (134) may also include sensors for sensing characteristics of the rig (101), such as bit depth, hole depth, drilling mudflow, hook load, rotary speed, etc.

In some embodiments, the surface sensing system (134) includes a surface pressure sensor (136) operable to sense the pressure of production (151) flowing through the well surface system (124), after it exits the wellbore (120). The surface pressure sensor (136) may include, for example, a wellhead pressure sensor that senses a pressure of production (121) flowing through or otherwise located in the wellhead (130). In some embodiments, the surface sensing system (134) includes a surface temperature sensor (138) operable to sense the temperature of production (151) flowing through the well surface system (124), after it exits the wellbore (120). The surface temperature sensor (138) may include, for example, a wellhead temperature sensor that senses a temperature of production (121) flowing through or otherwise located in the wellhead (130), referred to as "wellhead temperature" ($T_{wh}$). In some embodiments, the surface sensing system (134) includes a flow rate sensor (139) operable to sense the flow rate of production (151) flowing through the well surface system (124), after it exits the wellbore (120). The flow rate sensor (139) may include hardware that senses a flow rate of production (121) ($Q_{wh}$) passing through the wellhead (130).

Figure 2:
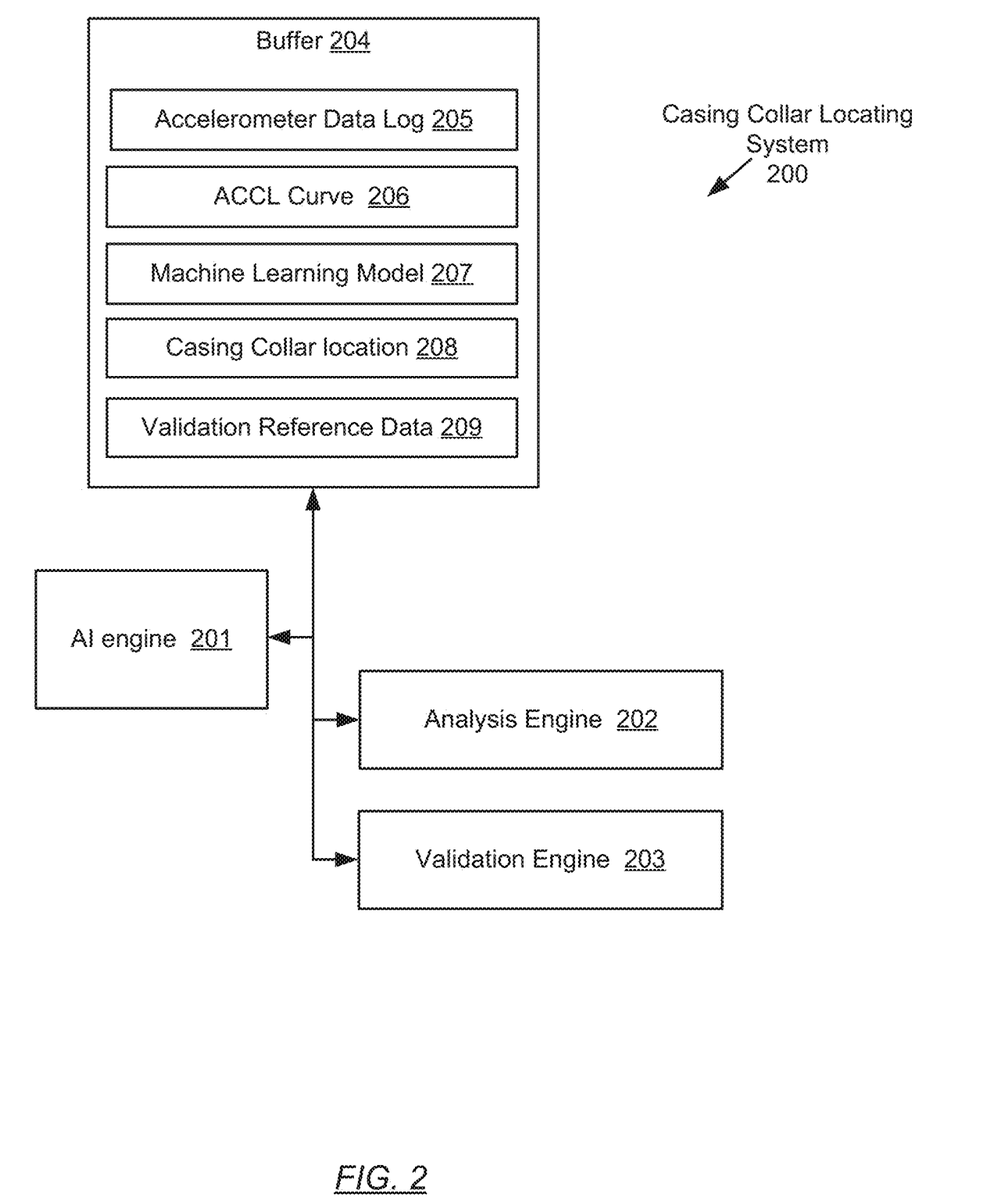

Turning to FIG. 2, FIG. 2 shows a schematic diagram in accordance with one or more embodiments. In one or more embodiments, one or more of the modules and/or elements shown in FIG. 2 may be omitted, repeated, and/or substituted. Accordingly, embodiments of the invention should not be considered limited to the specific arrangements of modules and/or elements shown in FIG. 2.

As shown in FIG. 2, FIG. 2 illustrates the casing collar locating system (200) that has multiple components, including, for example, a buffer (204), an artificial intelligence (AI) engine (201), an analysis engine (202), and a validation engine (203). In one or more embodiments of the invention, the casing collar locating system (200) is part of the control system (126) described in reference to FIG. 1 above. In one or more embodiments of the invention, the casing collar locating system (200) is implemented using the computing system described in reference to FIGS. 7A and 7B below. Each of these components (201, 202, 203, 204) may be located on the same computing device (e.g., personal computer (PC), laptop, tablet PC, smart phone, multifunction printer, kiosk, server, etc.) or on different computing devices that are connected via a network, such as a wide area network or a portion of Internet of any size having wired and/or wireless segments. Each of these components is discussed below.

In one or more embodiments of the invention, the buffer (204) may be implemented in hardware (i.e., circuitry), software, or any combination thereof. The buffer (204) is configured to store data generated and/or used by the casing collar locating system (200). The data stored in the buffer (204) includes the accelerometer data log (205), the ACCL curve (206), the machine learning model (207), the casing collar location (208), and the validation reference data (209).

The accelerometer data log (205) is a series of accelerometer data acquired along the path of the wellbore. Each piece of accelerometer data in the accelerometer data log (205) is a sensor output acquired at a sampling depth and represents measurements of the accelerometer signal along 3 independent directions. The ACCL curve (206) represents processed data derived from the accelerometer data log (205). The format of the ACCL curve (206) is suitable for comparing to one or more predetermined data features representing known accelerometer responses to casing collars. In one or more embodiments, the predetermined data features are learned feature vector values embedded in the machine learning model (207). The machine learning model (207) is an artificial intelligence and/or deep learning model to recognize the known accelerometer responses by comparing the ACCL curve (206) and the learned feature vector values. In one or more embodiments of the invention, the machine learning model (207) is a neural network model. The casing collar location (208) is a detected location of a casing collar based on the accelerometer data log (205) and the ACCL curve (206). The validation reference data (209) is data for validating the detected casing collar location (208). For example, the validation reference data (209) may include known casing collar locations based on a multi-finger caliper logging tool, a pipe tally, or a magnetic anomaly based casing collar locator.

In one or more embodiments of the invention, each of the AI engine (201), analysis engine (202), and validation engine (203) may be implemented in hardware (i.e., circuitry), software, or any combination thereof. In one or more embodiments, the AI engine (201) is configured to generate the casing collar location (208) by analyzing the accelerometer data log (205) and the ACCL curve (206) using a machine learning algorithm based on the machine learning model (207). In one or more embodiments, the AI engine (201) generates the casing collar location (208) using the method described in reference to FIG. 3 below. In one or more embodiments, the AI engine (201) is further configured to train the machine learning model based on a training dataset derived from the validation reference data (209). An example of generating the casing collar location (208) and training the machine learning model is described in reference to FIG. 6 below.

In one or more embodiments, the analysis engine (202) is configured to process the accelerometer data log (205) to generate the ACCL curve (206). In one or more embodiments, the accelerometer data log (205) and the ACCL curve (206) are then processed by the AI engine (201) to generate the casing collar location (208). In alternative embodiments, the analysis engine (202) generates the casing collar location (208) directly instead of employing the AI engine (201). In such embodiments, the analysis engine (202) is configured to compare the ACCL curve (208) and known accelerometer responses to casing collars to identify a match at a depth location of the ACCL curve (208). The depth location of the identified match corresponds to the casing collar location (208).

In one or more embodiments, the validation engine (202) is configured to validate the casing collar location (208) based on the validation reference data (209). For example, the validation engine (202) validates the casing collar location (208) by comparing the casing collar location (208) to known casing collar locations based on a multi-finger caliper logging tool, a pipe tally, or a magnetic anomaly based casing collar locator. An example of validating the casing collar location (208) is described in reference to FIG. 6 below.

Figure 3:
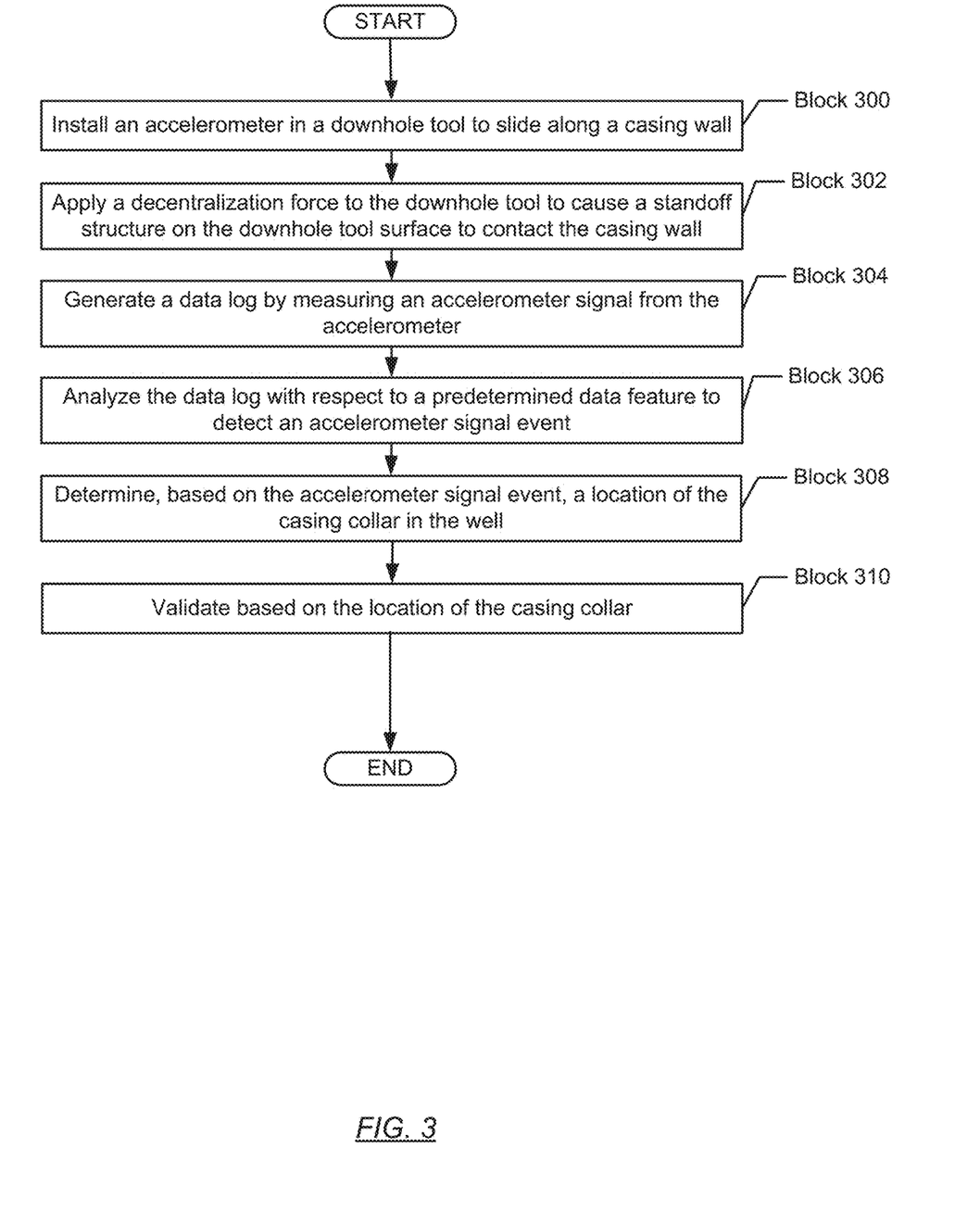
FIG. 3 shows a flowchart in accordance with one or more embodiments.

Turning to FIG. 3, FIG. 3 shows a method flowchart in accordance with one or more embodiments. Specifically, FIG. 3 describes a method for locating a casing collar in a well. One or more blocks in FIG. 3 may be performed using one or more components as described in FIGS. 1 and 2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially in Block 300, an accelerometer is lowered into the well to slide along a casing wall of the well. In one or more embodiment, the accelerometer is installed in a downhole tool where the accelerometer is mechanically coupled to a standoff structure on a surface of the downhole tool. The accelerometer may be mechanically coupled to the standoff structure via a direct mechanical connection. Alternatively, the accelerometer may be mechanically coupled to the standoff structure indirectly via an intervening element, such as an enclosure of the downhole too. The standoff structure may be a permanent extension of the enclosure of the downhole tool or an attachment that can be added onto or removed from the surface of the downhole tool as needed. For example, the standoff structure may be added prior to lowering the downhole tool with the accelerometer into the cased borehole to locate one or more casing collar(s). Subsequently, when the casing collar(s) are located, the standoff structure may be removed after the downhole tool is raised from the borehole to the surface. For example, the downhole tool may be lowered and raised using a wireline or a slickline. In another example, the downhole tool is a self-deployed robot traversing the path of the borehole without mechanical contact with surface equipment of the well. The downhole tool may communicate with the surface equipment using the wireline or using wireless data communication.

In Block 302, a decentralization force is applied to the downhole tool to cause the standoff structure to contact the casing wall. For example, the decentralization force may be applied to the downhole tool by way of a gravity force, a mechanical force, a hydrodynamic force, a magnetic force, and/or an electromagnetic force.

In Block 304, an accelerometer signal from the accelerometer is measured to generate a data log as the accelerometer slides along the casing wall. In one or more embodiments, high definition signal from the accelerometer is measured in all acquisition modes, such as tethered, untethered, SRO/memory, etc. For example, accelerometer signal is measured along the longitudinal axis as Az, in addition to along the transversal axes as Ax and Ay. In other words, each piece of data in the data log includes three components, namely Ax, Ay, and Az.

In Block 306, the data log is analyzed, using a computer system, with respect to a predetermined data feature to detect an accelerometer signal event. The computer system may be part of the surface equipment or embedded in the downhole tool. In one or more embodiments, the data log is converted into the ACCL curve before being analyzed. For example, the ACCL curve may include the RMS value of Ax, Ay, and Az for each sampling depth. The analysis involves comparing the ACCL curve with the predetermined data feature to detect an accelerometer signal event. The accelerometer signal event corresponds to a pattern (i.e., waveform) of the accelerometer signal induced by a mechanical response of the standoff structure crossing a connection gap of the casing collar as the downhole tool slides along the casing wall. In other words, the predetermined data feature includes this pattern (i.e., waveform) of the accelerometer signal after converting to RMS values. Accordingly, the accelerometer signal event is associated with a depth range over which the pattern of the accelerometer signal is detected in the data log.

In one or more embodiments, the ACCL curve is compared with the predetermined data feature by the analysis engine (202) depicted in FIG. 2 to detect the accelerometer signal event. In alternative embodiments where variations of the predetermined data feature exist, the ACCL curve is compared with the predetermined data feature by the AI engine (201) depicted in FIG. 2 to detect the accelerometer signal event. In such embodiments, the predetermined data features are learned feature vector values embedded in a machine learning model. The ACCL curve is analyzed by the AI engine (201) to extract a set of predefined features (i.e., a feature vector) that are fed into the machine learning model. The accelerometer signal event is then detected by comparing the extracted feature vector to learned feature vector values embedded in the machine learning model. Use of machine learning algorithms allows detecting the casing collar location with complex data features to improve accuracy and resolves ambiguity over special casing components, such as pup-joint, nipple, etc. In particular, the pup-joint is a pipe of non-standard length used to adjust the length of the casing to an exact requirement. The nipple is a short piece of pipe particularly shorter than other casing joints.

In Block 308, a location of the casing collar is determined by the computer processor based on the accelerometer signal event. In one or more embodiments, the location of the casing collar is defined as the center of the depth range associated with the accelerometer signal event.

In Block 310, the location of the casing collar is validated. In one or more embodiments, the location of the casing collar determined in Block 308 is compared to casing collar locations determined using alternative means, such as a casing diameter log from a multi-finger caliper logging tool, a pipe tally, or a result of a magnetic anomaly based casing collar locator to generate a comparison result. The location of the casing collar is validated when the difference found in the comparison is within a predetermined tolerance, such as 5% or other suitable threshold.

Figure 4:
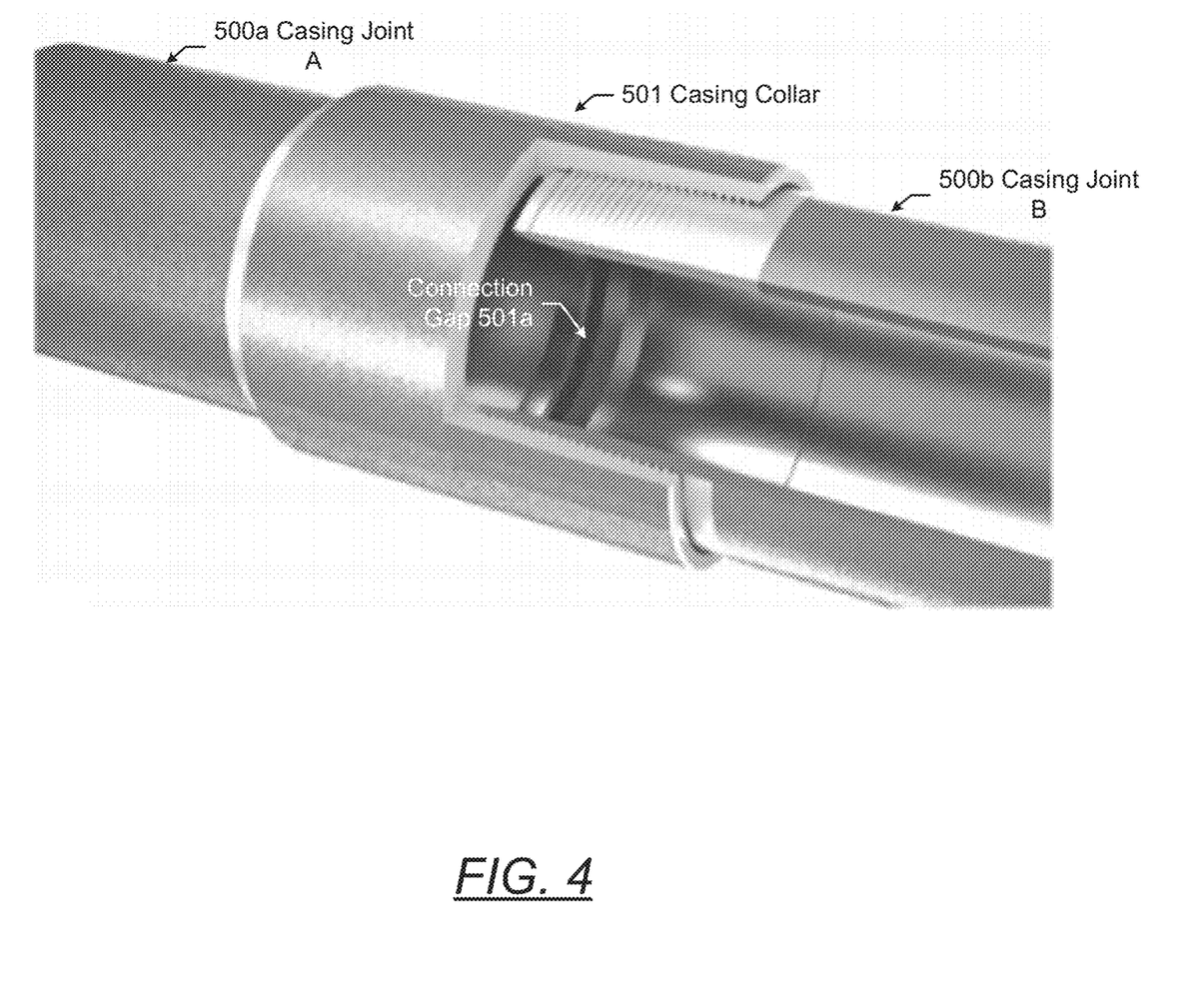
FIGS. 4, 5, and 6 show an example in accordance with one or more embodiments.
Figure 5:
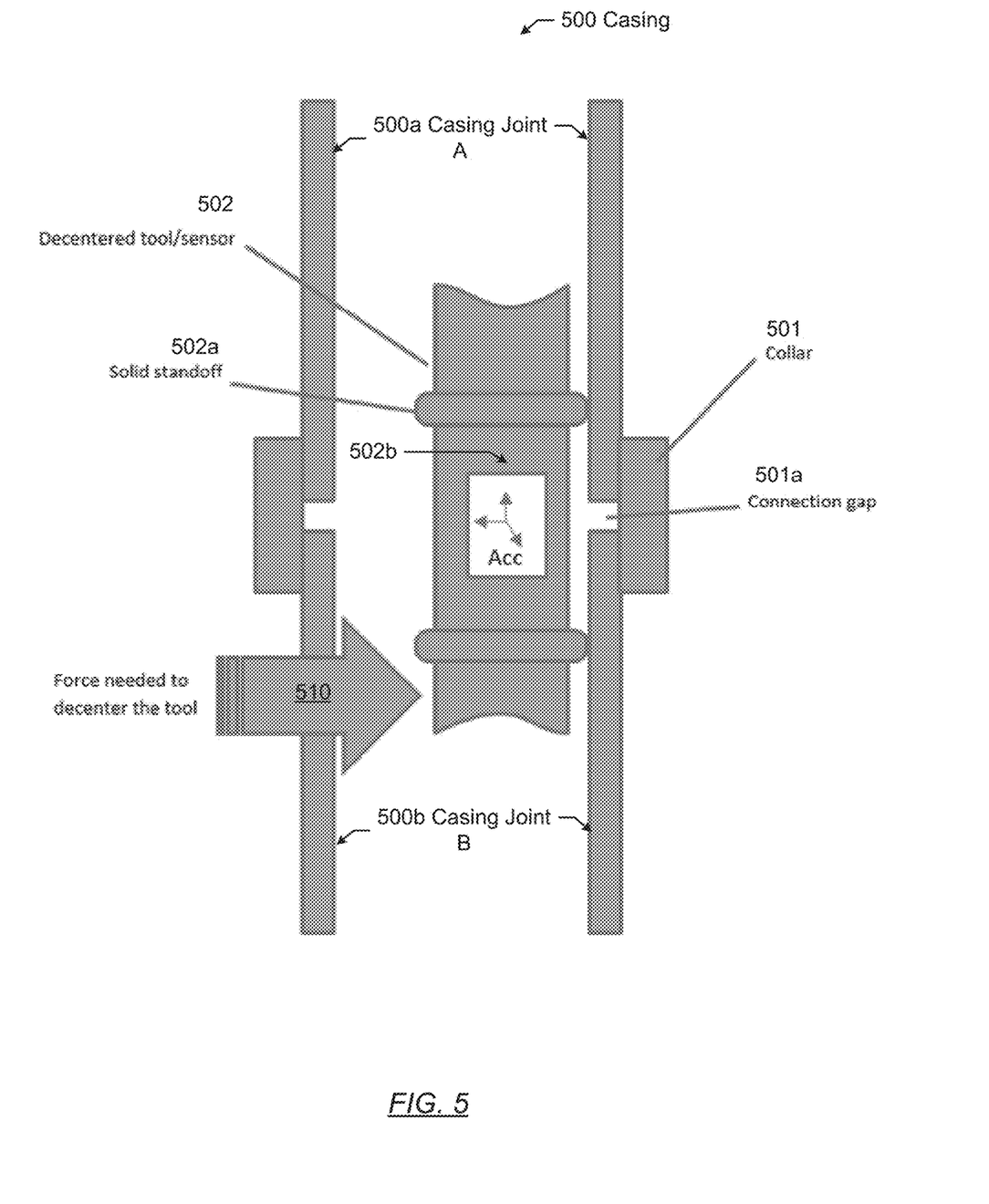
Figure 6:
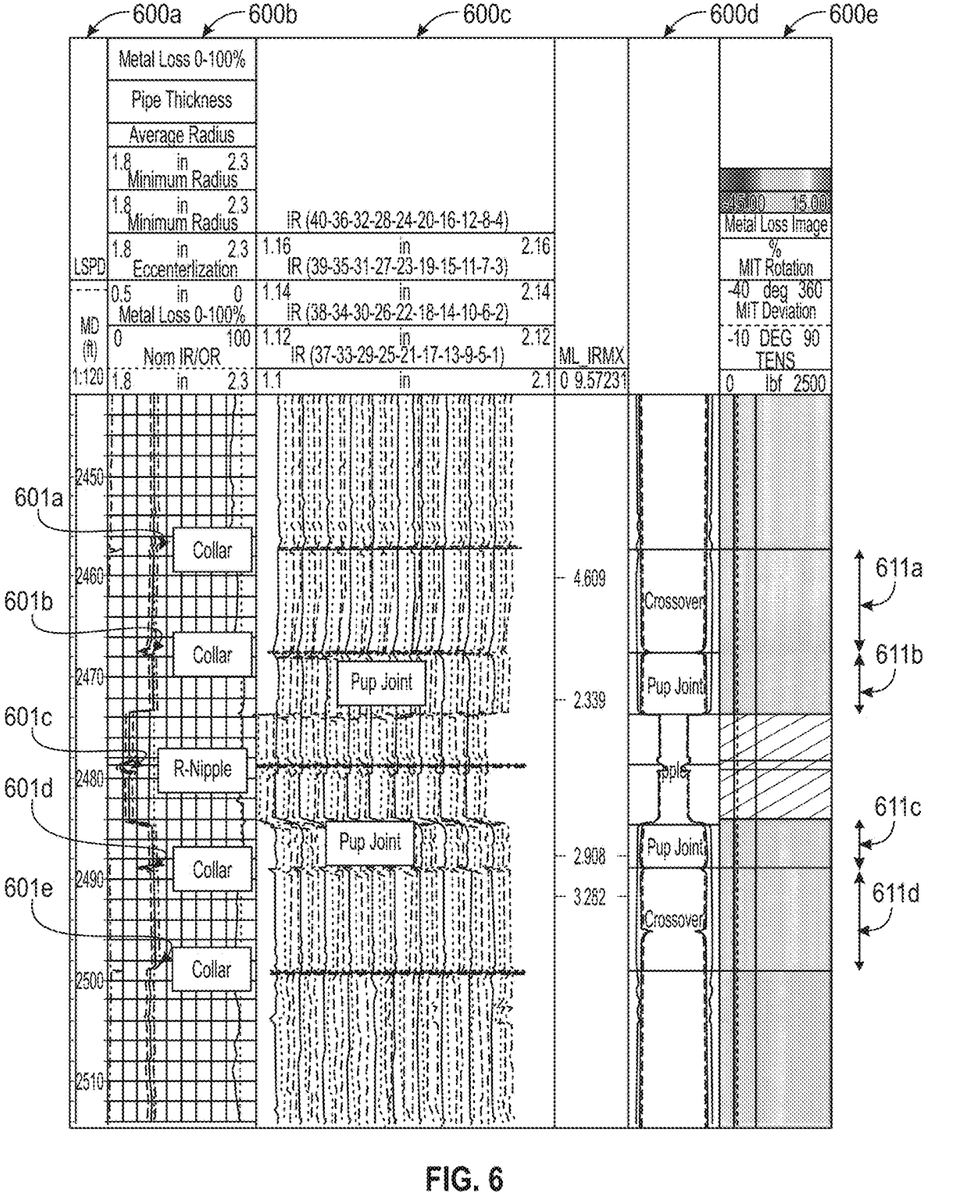

Turning to FIGS. 4-6, FIGS. 4-6 provides an example of automatically locating a casing collar in a well. The example shown in FIGS. 4A-6 may be, for example, based on one or more components depicted in FIGS. 1-2 above and the method flowchart depicted in FIG. 3 above. In one or more embodiments, one or more of the modules and/or elements shown in FIGS. 4-6 may be omitted, repeated, and/or substituted. Accordingly, embodiments of the invention should not be considered limited to the specific arrangements of modules and/or elements shown in FIGS. 4-6.

FIG. 4 illustrates an example casing with a casing collar in accordance with one or more embodiments of the invention. In particular, FIG. 4 shows a portion of the casing including a casing joint A (500a) and a casing joint B (500b) that are coupled together via a casing collar (501). Specifically, the casing joint A (500a), casing joint B (500b), and casing collar (501) are threaded for mechanical coupling. A connection gap (501a) exists between the casing joint A (500a) and the casing joint B (500b).

FIG. 5 illustrates a schematic diagram showing a downhole tool/sensor (502) that is lowered into a wellbore that is stabilized by the casing depicted in FIG. 4 above. As shown in FIG. 5, the downhole tool/sensor (502) includes a standoff structure (502a) in the form of a concentric ring attached to, disposed on, or otherwise extended from the exterior surface of the downhole tool/sensor (502). Multiple standoff structures may be included in the downhole tool/sensor (502). For example, two standoff structures are depicted in FIG. 5. In addition, each of the standoff structure (e.g., standoff structure (502a)) is coupled to an accelerometer (502b). The standoff structure (502a) contacts and traverses the inner wall of the casing as the downhole tool/sensor (502) travels (e.g., pulled up, lowered, or self-deployed) along the longitudinal direction of the casing. To ensure mechanical coupling of the downhole tool/sensor (502) (more specifically, the standoff structure (502a)) with the inner wall of the casing, decentralization force (510) is applied to the downhole tool/sensor (502) as the downhole tool/sensor (502) travels up and/or down inside the wellbore. The decentralization force (510) may be applied to the downhole tool/sensor (502) by way of a gravity force, a mechanical force (e.g., exerted by a mechanical arm, bow-spring, etc.), a hydrodynamic force, a magnetic force, an electromagnetic force, etc.

Accelerometer data is acquired from the accelerometer (520b) periodically at consecutive sampling depths to generate a data log as the standoff structure (502a) traverses the inner wall of the casing. The accelerometer data at each sampling depth includes measurements of accelerometer signal along 3 independent directions and is represented as [Ax, Ay, Az]. The data log is processed to derive an accelerometer data curve referred to as the ACCL curve, where ACCL=f(Ax, Ay, Az) at each sampling depth. For example, ACCL may equal the root-mean-square (RMS) function of Ax, Ay, and Az. Speed corrected depth log is produced using ACCL and compared to detail records of casing joints (i.e., pipe tally) to validate the detected casing collar locations. For example, the accelerometer (520b) may generate an accelerometer signal event (e.g., peak measurement) as the standoff structure (502a) traverses from the casing joint A (500a) to casing joint B (500b) by crossing the connection gap (501a). The accelerometer signal event in the data log corresponds to the depth location of the casing collar (501). Similarly, the depth of another casing collar (not shown) at the other end of the casing joint A (500a) may be detected in the data log. The depth difference between the casing collar (501) and another casing collar corresponds to the length of the casing joint A (500a), which is compared to the casing joint length recorded in the pipe tally for validation.

FIG. 6 illustrates example comparison between well logs acquired by the downhole tool/sensor (502), a multi-finger caliper logging tool, and a conventional casing collar locator that are lowered into the wellbore depicted in FIG. 5 above. The multi-finger caliper logging tool is a device for measuring the diameter of the internal wall of the casing at various depths using multiple caliper arms (referred to as fingers). By using a large number of arms, or fingers, the caliper can detect small changes in the internal wall of the casing, which may correspond to deformations, buildup of scale, metal loss due to corrosion, or the connection gap of the casing collar. The conventional casing collar locator is based on detecting the magnetic anomaly caused by the relatively high mass of the casing collar.

The well logs shown in FIG. 6 include multiple data channels (600b) through (600e) that are plotted against the depth scale (600a). The data channel (600b) corresponds to the ACCL curve from the downhole tool/sensor (502) where markings (601a), (601b), (601c), (601d), and (601e) correspond to detected accelerometer signal events. The data channel (600c) corresponds to measurements from the multi-finger caliper logging tool where diameter changes are evident at depth locations corresponding to the markings (601a), (601b), (601c), (601d), and (601e). The data channel (600d) corresponds to casing joint descriptions identified based on the pipe tally and the outputs of the conventional casing collar locator. In particular, the data channel (600e) corresponds to outputs from the conventional casing collar locator. The casing joint descriptions identified in the data channel (600d) and the diameter changes detected by the multi-finger caliper logging tool in the data channel (600c) collectively correlate the accelerometer signal events at the markings (601a), (601b), (601c), (601d), and (601e) as locations of the casing collars. Accordingly, the ACCL curve in the data channel (600b) and associated raw accelerometer data log are used as training dataset to train a machine learning model for automatically locating casing collars using machine learning techniques. Subsequent to training the machine learning model in a training phase, a machine learning algorithm is used to predict response and interpret accelerometer signal events based on collected accelerometer data log and the machine learning model.

Figure 7A:
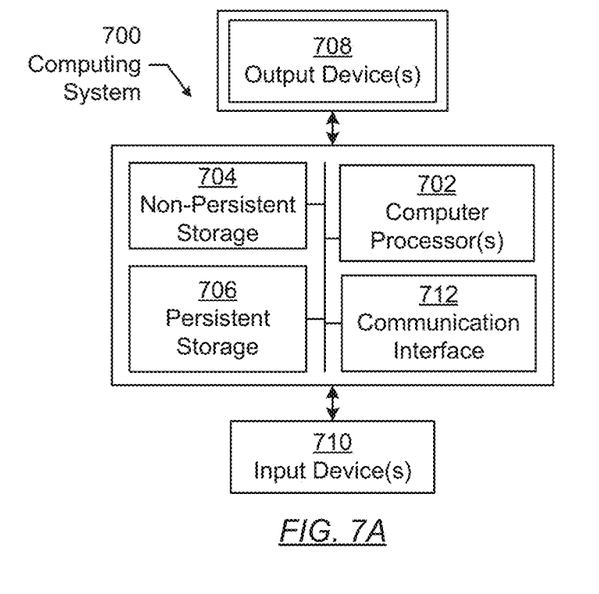
FIGS. 7A and 7B show a computing system in accordance with one or more embodiments.

Embodiments may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 7B:
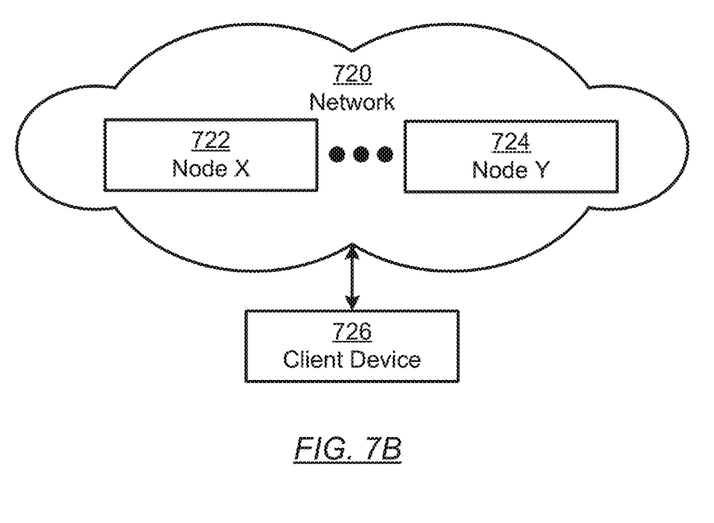

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method for locating a casing collar in a well, comprising:
   lowering an accelerometer into the well to slide along a casing wall of the well;
   generating a data log by measuring an accelerometer signal from the accelerometer as the accelerometer slides along the casing wall;
   analyzing, by a computer processor, the data log with respect to a predetermined data feature to detect an accelerometer signal event; and
   determining, by the computer processor and based on the accelerometer signal event, a location of the casing collar in the well.

2. The method of claim 1, further comprising:
   installing the accelerometer in a downhole tool to slide along the casing wall, wherein the accelerometer is mechanically coupled to a standoff structure on a surface of the downhole tool; and
   applying a decentralization force to the downhole tool to cause the standoff structure to contact the casing wall,
   wherein the accelerometer signal event corresponds to a pattern of the accelerometer signal induced by a mechanical response of the standoff structure crossing a connection gap of the casing collar as the downhole tool slides along the casing wall.

3. The method of claim 2, wherein lowering the accelerometer into the well comprises lowering the downhole tool into the well using a wireline or a slickline.

4. The method of claim 2, wherein the downhole tool is a self-deployed robot traversing along a longitudinal direction of the well.

5. The method of claim 2,
   wherein the decentralization force is applied to the downhole tool by way of one or more of gravity force, mechanical force, hydrodynamic force, magnetic force, and electromagnetic force.

6. The method of claim 1, further comprising:
   comparing the location of the casing collar to one or more of a casing diameter log from a multi-finger caliper logging tool, a pipe tally, and a result of a magnetic anomaly based casing collar locator to generate a comparison result; and
   validating the location of the casing collar based on the comparison result.

7. The method of claim 1,
   wherein analyzing the data log to detect the accelerometer signal event comprises using a machine learning algorithm based on a machine learning model comprising the predetermined data feature, and
   wherein the machine learning model is trained using one or more of a casing diameter log from a multi-finger caliper logging tool, a pipe tally, and a result of a magnetic anomaly based casing collar locator.

8. A system for locating a casing collar in a well, comprising:
   an accelerometer lowered into the well to slide along a casing wall of the well;
   a processor; and
   a memory coupled to the processor and storing instruction, the instructions, when executed by the processor, comprising functionality for:
     generate a data log by measuring an accelerometer signal from the accelerometer as the accelerometer slides along the casing wall;
     analyzing the data log with respect to a predetermined data feature to detect an accelerometer signal event; and
     determining, based on the accelerometer signal event, a location of the casing collar in the well.

9. The system of claim 8, further comprising:
   a downhole tool comprising the accelerometer to slide along the casing wall, wherein the accelerometer is mechanically coupled to a standoff structure on a surface of the downhole tool,
   wherein a decentralization force is applied to the downhole tool to cause the standoff structure to contact the casing wall, and wherein the accelerometer signal event corresponds to a pattern of the accelerometer signal induced by a mechanical response of the standoff structure crossing a connection gap of the casing collar as the downhole tool slides along the casing wall.

10. The system of claim 9, wherein lowering the accelerometer into the well comprises lowering the downhole tool into the well using a wireline or a slickline.

11. The system of claim 9, wherein the downhole tool is a self-deployed robot traversing along a longitudinal direction of the well.

12. The system of claim 9,
wherein the decentralization force is applied to the downhole tool by way of one or more of gravity force, mechanical force, hydrodynamic force, magnetic force, and electromagnetic force.

13. The system of claim 8, the instructions, when executed by the processor, further comprising functionality for:
comparing the location of the casing collar to one or more of a casing diameter log from a multi-finger caliper logging tool, a pipe tally, and a result of a magnetic anomaly based casing collar locator to generate a comparison result; and
validating the location of the casing collar based on the comparison result.

14. The system of claim 8,
wherein analyzing the data log to detect the accelerometer signal event comprises using a machine learning algorithm based on a machine learning model comprising the predetermined data feature, and
wherein the machine learning model is trained using one or more of a casing diameter log from a multi-finger caliper logging tool, a pipe tally, and a result of a magnetic anomaly based casing collar locator.

15. A non-transitory computer readable medium storing instructions executable by a computer processor for locating a casing collar in a well, the instructions, when executed, comprising functionality for:
generating a data log by measuring an accelerometer signal from an accelerometer as the accelerometer slides along the casing wall;
analyzing the data log with respect to a predetermined data feature to detect an accelerometer signal event; and
determining, based on the accelerometer signal event, a location of the casing collar in the well.

16. The non-transitory computer readable medium of claim 15,
wherein the accelerometer is installed in a downhole tool to slide along the casing wall, wherein the accelerometer is mechanically coupled to a standoff structure on a surface of the downhole tool;
wherein a decentralization force is applied to the downhole tool to cause the standoff structure to contact the casing wall, and
wherein the accelerometer signal event corresponds to a pattern of the accelerometer signal induced by a mechanical response of the standoff structure crossing a connection gap of the casing collar as the downhole tool slides along the casing wall.

17. The non-transitory computer readable medium of claim 16, wherein lowering the accelerometer into the well comprises lowering the downhole tool into the well using a wireline or a slickline.

18. The non-transitory computer readable medium of claim 16, wherein the downhole tool is a self-deployed robot traversing along a longitudinal direction of the well.

19. The non-transitory computer readable medium of claim 15, the instructions, when executed, further comprising functionality for:
comparing the location of the casing collar to one or more of a casing diameter log from a multi-finger caliper logging tool, a pipe tally, and a result of a magnetic anomaly based casing collar locator to generate a comparison result; and
validating the location of the casing collar based on the comparison result.

20. The non-transitory computer readable medium of claim 15,
wherein analyzing the data log to detect the accelerometer signal event comprises using a machine learning algorithm based on a machine learning model comprising the predetermined data feature, and
wherein the machine learning model is trained using one or more of a casing diameter log from a multi-finger caliper logging tool, a pipe tally, and a result of a magnetic anomaly based casing collar locator.

* * * * *

UNITED STATES PATENT AND TRADEMARK OFFICE
CERTIFICATE OF CORRECTION

| | |
|---|---|
| PATENT NO. | : 11,125,076 B1 |
| APPLICATION NO. | : 16/934585 |
| DATED | : September 21, 2021 |
| INVENTOR(S) | : Mohamed Larbi Zeghlache |

It is certified that error appears in the above-identified patent and that said Letters Patent is hereby corrected as shown below:

On the Title Page

At (12), the name "Zeghlache" should read -- Larbi Zeghlache --

Signed and Sealed this
Twenty-fifth Day of June, 2024

*Katherine Kelly Vidal*
Katherine Kelly Vidal
*Director of the United States Patent and Trademark Office*